(12) United States Patent
Kikuchi et al.

(10) Patent No.: US 6,713,927 B2
(45) Date of Patent: Mar. 30, 2004

(54) ROTATING ELECTRIC MACHINE

(75) Inventors: Toshio Kikuchi, Yokosuka (JP);
Shinichiro Kitada, Tokyo (JP); Yutaro Kaneko, Yokohama (JP); Takashi Tsuneyoshi, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/986,046

(22) Filed: Nov. 7, 2001

(65) Prior Publication Data

US 2002/0074871 A1 Jun. 20, 2002

(30) Foreign Application Priority Data

Dec. 14, 2000 (JP) ........................................ 2000-379747

(51) Int. Cl.[7] ................................................. H03K 3/48
(52) U.S. Cl. ..................................... 310/214; 310/60 A
(58) Field of Search .............................. 310/214, 60 R, 310/60 A, 89, 254, 258, 259

(56) References Cited

U.S. PATENT DOCUMENTS

| 2,899,573 A | | 8/1959 | Wesolowski ............... 310/60 R |
|---|---|---|---|
| 4,227,108 A | * | 10/1980 | Washizu et al. ............ 310/214 |
| 4,409,502 A | * | 10/1983 | McCabria .................... 310/165 |
| 4,467,229 A | | 8/1984 | Ogita |
| 5,519,269 A | * | 5/1996 | Lindberg ....................... 310/58 |
| 5,583,387 A | * | 12/1996 | Takeuchi et al. ....... 174/DIG. 20 |
| 6,008,563 A | * | 12/1999 | Baba et al. .................. 310/194 |
| 6,113,024 A | * | 9/2000 | Pittard et al. ................ 242/433 |
| 6,335,582 B1 | * | 1/2002 | Abukawa et al. ....... 310/156.38 |

FOREIGN PATENT DOCUMENTS

| JP | 53-95207 | 8/1978 | |
|---|---|---|---|
| JP | 59 0411147 | 3/1984 | ............ H02K/9/02 |
| JP | 4-364343 | 12/1992 | |

* cited by examiner

Primary Examiner—Thomas M. Dougherty
Assistant Examiner—Nguyen N Hanh
(74) Attorney, Agent, or Firm—Foley & Lardner

(57) ABSTRACT

A rotating electric machine using an inner section of a slot of a stator as a cooling passage obtains highly effective cooling performance with a small amount of cooling medium. An opening for a slot in a stator is closed by an under plate having a closing member. A regulating plate is disposed which is a member for regulating the cross-sectional area of the passage in substantially a central section of the slot. In this manner, the cross-sectional area of the cooling passage with the plate in the slot is smaller than the cross-sectional area when the regulating plate is not provided by an area corresponding to the cross-sectional area of the regulating plate. This arrangement allows increases in cooling efficiency.

2 Claims, 8 Drawing Sheets

ROTATING ELECTRIC MACHINE

FIELD OF THE INVENTION

This invention relates to a rotating electric machine which is used as a motor, or as a generator, or as a motor/generator.

BACKGROUND OF THE INVENTION

Tokkai Sho 53-95207 published by the Japanese Patent Office in 1978 and Tokkai Hei 4-364343 published by the Japanese Patent Office in 1992 disclose a rotating electric machine which uses an inner section of a slot of a stator as a cooling passage in order to effectively cool the stator. The slot comprises a groove storing a stator coil. This type of rotating electric machine displays highly effective cooling performance since the stator coils or stator which generate heat come into direct contact with the cooling medium passing through the cooling passage.

SUMMARY OF THE INVENTION

However since the conventional rotating electric machine simply uses a space in the slot as a cooling passage without any modification, the cross sectional area of the cooling passage is too large. In such a case, excess cooling medium flows into a section separated from the stator coils or the stator which generate heat.

It is therefore an object of this invention to provide a rotating electrical machine which uses an inner section of a slot of a stator as a cooling passage in order to obtain a highly effective cooling performance with a small flow amount of cooling medium.

In order to achieve above object, this invention provides a rotating electric machine having a stator with a slot housing coils, and a closing member for closing the opening of the slot and forming a cooling passage in the slot, the rotating electric machine comprising a regulating member for narrowing the cross-sectional area of the cooling passage in the slot.

Furthermore, this invention provides a rotating electric machine, comprising a stator having a stator core and a slot, coils housed in the slot, a closing member for closing the opening of the slot and partitioning a cooling passage in the slot, wherein the coils are provided in a coiling region limited to a position near the bottom of the slot, and the overall region closer to the opening of the slot than the coils is filled by the closing member.

The details as well as other features and advantages of this invention are set forth in the remainder of the specification and are shown in the accompanying drawings.

DESCRIPTION OF THE PREFERRED EMBODIMENTS

Figure 1:
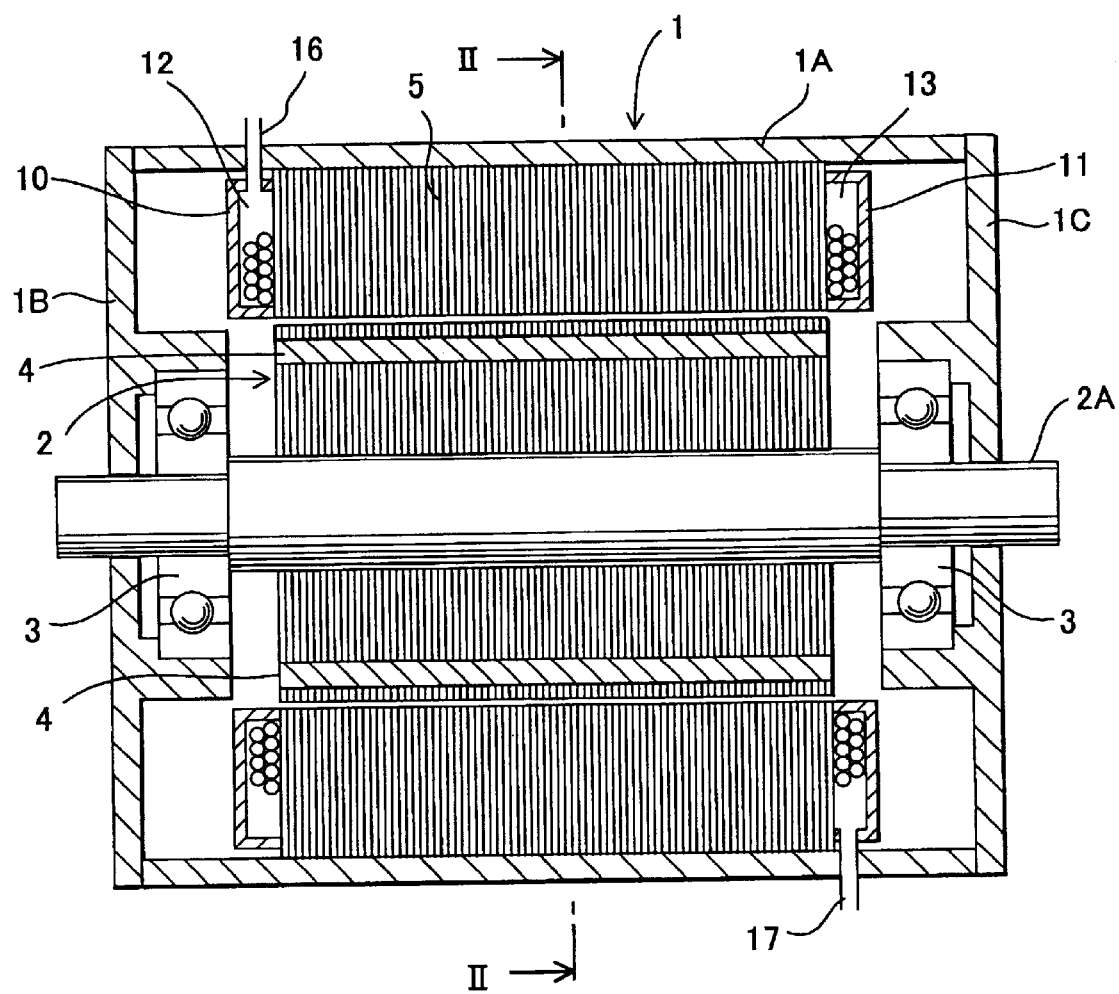
FIG. 1 is a sectional view of a rotating electric machine applied to each embodiment of this invention.

Referring to FIG. 1, the case 1 of the rotating electric machine comprises a cylindrical plate 1A and lateral plates 1B, 1C covering an opening on both axial ends of the cylindrical plate 1A.

A columnar rotor 2 is housed in the case 1. The rotor 2 rotates about the rotation shaft 2A. Both ends of the rotation shaft 2A of the rotor 2 are supported on lateral plates 1B, 1C through respective bearings 3. Furthermore a magnet 4 is provided in proximity to the outer peripheral face of the rotor 2.

A cylindrical stator 5 is mounted on the inner peripheral face of the cylindrical plate 1A, encircling the rotor 2. A predetermined gap is provided between the inner peripheral face of the stator 5 and the outer peripheral face of the rotor 2. The width of the predetermined gap is less than 1.0 mm.

Figure 2:
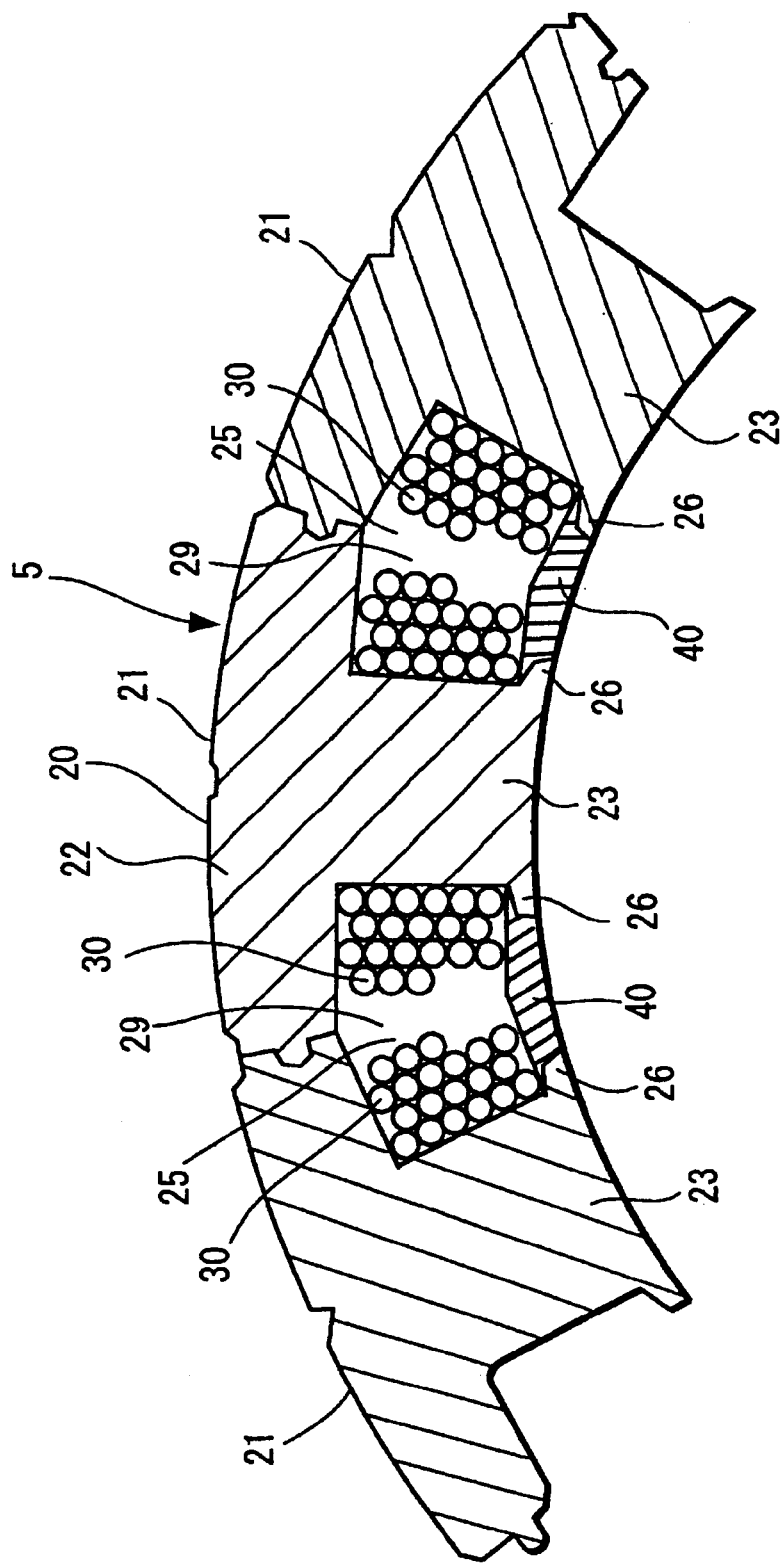
FIG. 2 is a partially sectional view showing a section of FIG. 1 along the line II—II of the stator before disposing a regulating member for regulating a cross sectional area of the passage according to a first embodiment of this invention.

The ring-shaped oil jackets 10, 11 with a U-shaped cross section are respectively mounted on both axial ends of the stator 5. Oil chambers 12, 13 are formed between the end face of the stator 5 and the inner side of the oil jackets 10, 11. Cooling oil is supplied to an oil chamber 12 through an oil supply mouth 16 which is formed in the oil jacket 10 and passes through the cylindrical plate 1A. The cooling oil is introduced into the oil chamber 13 through the cooling passage 29 formed in the stator 5 as shown in FIG. 2. The cooling oil introduced into the oil chamber 13 is discharged to the outside from an oil discharge mouth 17 which is formed in the oil jacket 11 and passes through the cylindrical plate 1A.

Referring to FIG. 2, a stator 5 will be described below in a state in which a regulating member is not fitted. The regulating member regulates the cross sectional area of a passage according to a first embodiment of this invention.

The stator core 20 with a cylindrical shape is formed by connecting a plurality of divided cores 21. That is to say, the stator core 20 comprises divided cores. In this embodiment, the number of divided cores is twelve. Each of the divided cores 21 is formed by laminating a fixed number of T-shaped magnetic steel plates with respect to the rotation shaft 2A of the rotor 2. In other words, the plates are laminating perpendicular to the surface of the page in FIG. 2. Three of the twelve divided cores 21 included in the stator core 20 are shown in FIG. 2. The fixed number is determined by the thickness of the T-shaped magnetic steel plate and the required size of the stator core 20.

An arrangement of divided cores according to the embodiments of this invention comprises back core sections of each divided core 21 being arranged in a cylindrical shape to form a back core section 22 of the stator core 20. The teeth of each divided core 21 comprise the teeth 23 of the stator core 20.

An indentation between adjacent teeth 23, that is to say, a groove constitutes the slot 25. The length of the teeth 23, namely the degree of projection in a radial direction, the width, namely the thickness in a peripheral direction, and the interval between adjacent teeth 23, namely the size of the slot 25 are set to an optimal value in response to characteristics such as the output, torque and efficiency required by the rotating electric machine.

The coils 30 are stored in the slot 25 by concentrated windings on each of the teeth 23. The windings of the coils 30 on the teeth 23 are performed in each divided core 21 before connecting them. That is to say, when manufacturing the stator 5, firstly wire is wound across a fixed layer on the teeth 23 of each of the divided cores 21 by a fixed number of windings, namely number of turns. Then the stator 5 is formed by arranging the divided cores 21 with coils wound thereon in the above manner.

To describe this in more detail, there are firstly six turns in the wire in a first layer. The wire turns are performed from the base of the teeth 23 towards the tip without a clearance. Next, a second layer comprising five wire turns is formed subsequently to the first layer windings, from the tip of the teeth 23 towards the base, on top of the wire comprising the first layer. Thereafter in the same manner, a third layer comprising six wire turns, and a fourth layer comprising three wire turns are performed in sequence. In this manner, a total of twenty wire turns are performed on the teeth 23 of the divided cores 21. Thus it is possible to streamline the coil winding operation in a divided core structure. The number of turns being twenty is merely exemplary and the number of wire turns may be optimized in response to performance characteristics required by the rotating electric machine.

A predetermined number of divided cores 21 with the coils 30 are connected in a cylindrical shape to form the stator core 20, and the stator core 20 is fitted onto the inner peripheral face of the cylindrical plate 1A by shrink fitting for example. The predetermined number of divided cores in this embodiment is set at twelve. Thus the stator 5 is provided with an arrangement of divided cores 21.

Projections 26 project from both lateral faces on the tip of the teeth 23, namely from inner peripheral face of the opening of the slot 25. An under plate 40 is fitted onto an inner section of the projection 26. The under plate 40 is a closing member for closing the opening of the slot 25. The under plate 40 extends in a direction parallel to the rotation shaft 2A of the rotor 2 and closes the entire opening of the slot 25. In other words, the under plate 40 extends in a direction perpendicular to the surface of the page in FIG. 2. The space in the inner section of the slot 25 which is closed by the under plate 40 (apart from the space designated for the coils 30) comprises a cooling passage 29 extending in a direction parallel to the rotation shaft 2A. In this case, the cross-sectional area orthogonal to the rotation shaft 2A of the cooling passage 29 is termed a cross-sectional area S1.

Figure 3:
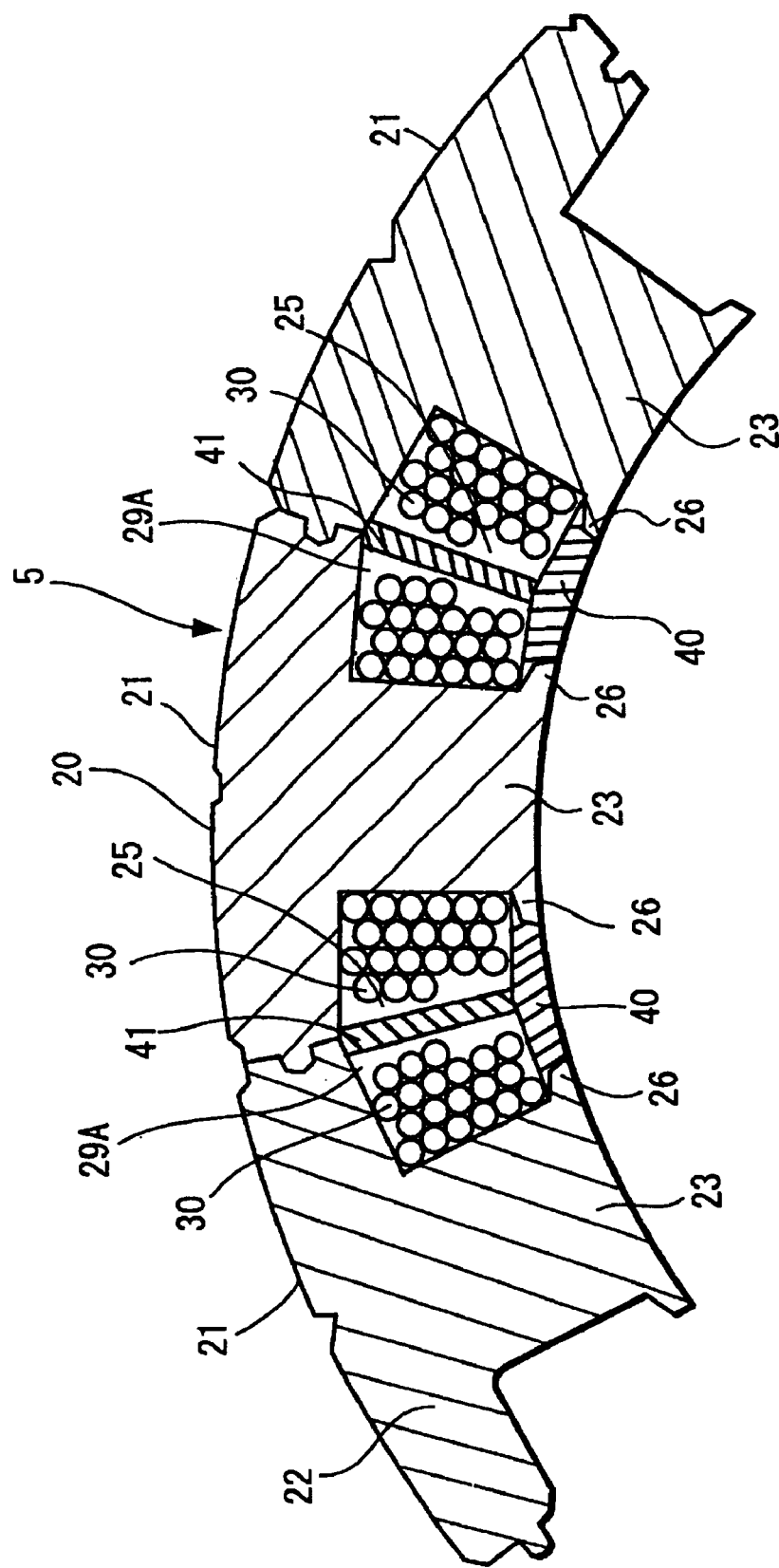
FIG. 3 is a partially sectional view showing a section of FIG. 1 along the line II—II of the stator according to a first embodiment of this invention.

Referring to FIG. 3, a regulating plate 41 for regulating the cross-sectional area of the passage is disposed as a regulating member in the cooling passage 29 formed as described above. The regulating plate 41 is disposed in substantially a central section of the slot 25 and extends in a direction parallel to the rotation shaft 2A of the rotor 2. In FIG. 3, an orientation with respect to the rotation shaft 2A of the rotor 2 corresponds to a direction which is perpendicular to the surface of the page. The regulating plate 41 is sandwiched and fixed between the bottom of the slot 25 and the inner face of the under plate 40. Here, the bottom of the slot 25 means the back core section 22. The inner face of the under plate 40 is the surface which faces the inner side of the slot 25.

After subtracting the area designated for the regulating plate 41 from the cooling passage, the remainder comprises a cooling passage 29A. Thus a cross-sectional area S2 of a cooling passage 29A when a regulating plate 41 is provided corresponds to a cross-sectional area of the regulating plate 41 subtracted from the cross-sectional area S1 of the cooling passage 29. Therefore the respective cross-sectional areas display a relation of S1 greater than S2 (S1>S2).

While a flow amount of cooling medium (oil) is maintained, the flow speed of the cooling medium is increased by reductions in the cross-sectional area S2 of the cooling passage 29A. Cooling efficiency is improved as a result. Thus it is possible to decrease the capacity of a cooling medium recirculation pump required in order to obtain an effective cooling efficiency.

Furthermore the regulating plate 41 is disposed in substantially a central section of the slot 25 and the cooling passage 29A is formed in a section in proximity to the coils 30. As a result, the cooling medium flows only in the narrow regions near to the coils 30 and unnecessary flow of cooling medium through sections apart from the coils 30 can be avoided. In other words, the amount of cooling medium required for cooling can be reduced.

The degree of reduction in the cross-sectional area of the cooling passage 29A can be regulated by varying the cross-sectional area of the regulating plate 41. This allows corresponding streamlining of the design of the cooling structure in the rotating electric machine.

Figure 4:
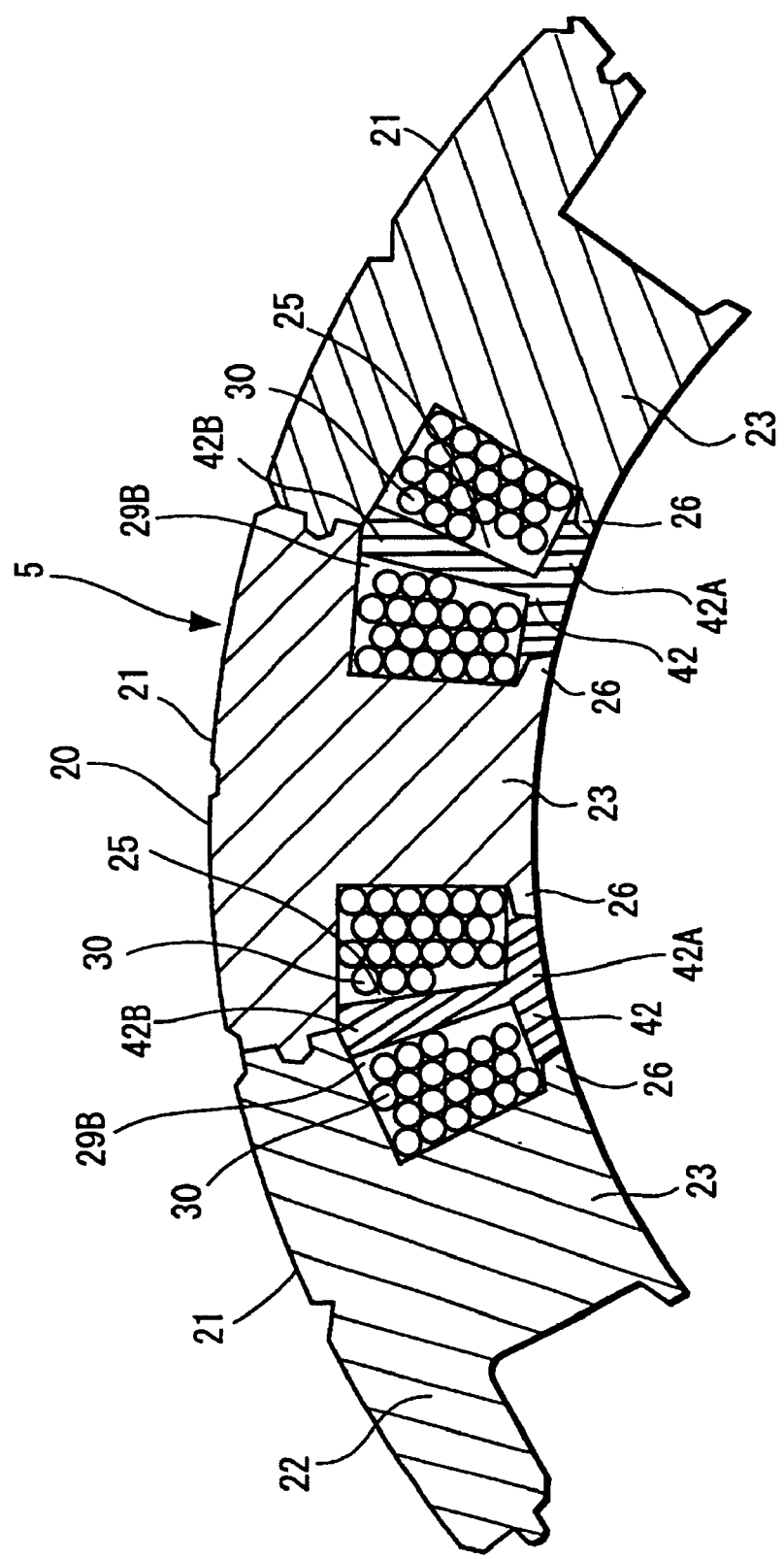
FIG. 4 is a partially sectional view showing a section of FIG. 1 along the line II—II of the stator according to a second embodiment of this invention.

Referring to FIG. 4, the stator 5 according to a second embodiment of this invention will be described below.

In this embodiment of the invention, the under plate 42 closing the opening of the slot 25 comprises a main section 42A disposed along the opening of the slot 25 and a leg 42B extending towards a substantially central section inside the slot 25. The leg 42B regulates the cross-sectional area of the passage as a regulating member. That is to say, in this embodiment of the invention, the closing member and the regulating member are integrated.

A cross-sectional area S3 of the cooling passage 29B is smaller than the cross-sectional area S1 of the cooling passage 29 in FIG. 2 by an area corresponding to the cross-sectional area of the leg 42B. Thus cooling efficiency is improved by cooling the stator 5 efficiently with a lower amount of cooling medium in the same manner as the first embodiment.

Furthermore in this embodiment, since the main section 42A and the leg 42B are integrated into the under plate 42, the number of components is reduced resulting in cost efficiencies. When assembling the stator 5, since it is not necessary to mount a regulating member for regulating the cross-sectional area of the passage as a separate member from the under plate 42, assembly operations are facilitated and simplified,which results in corresponding cost efficiencies.

Figure 5:
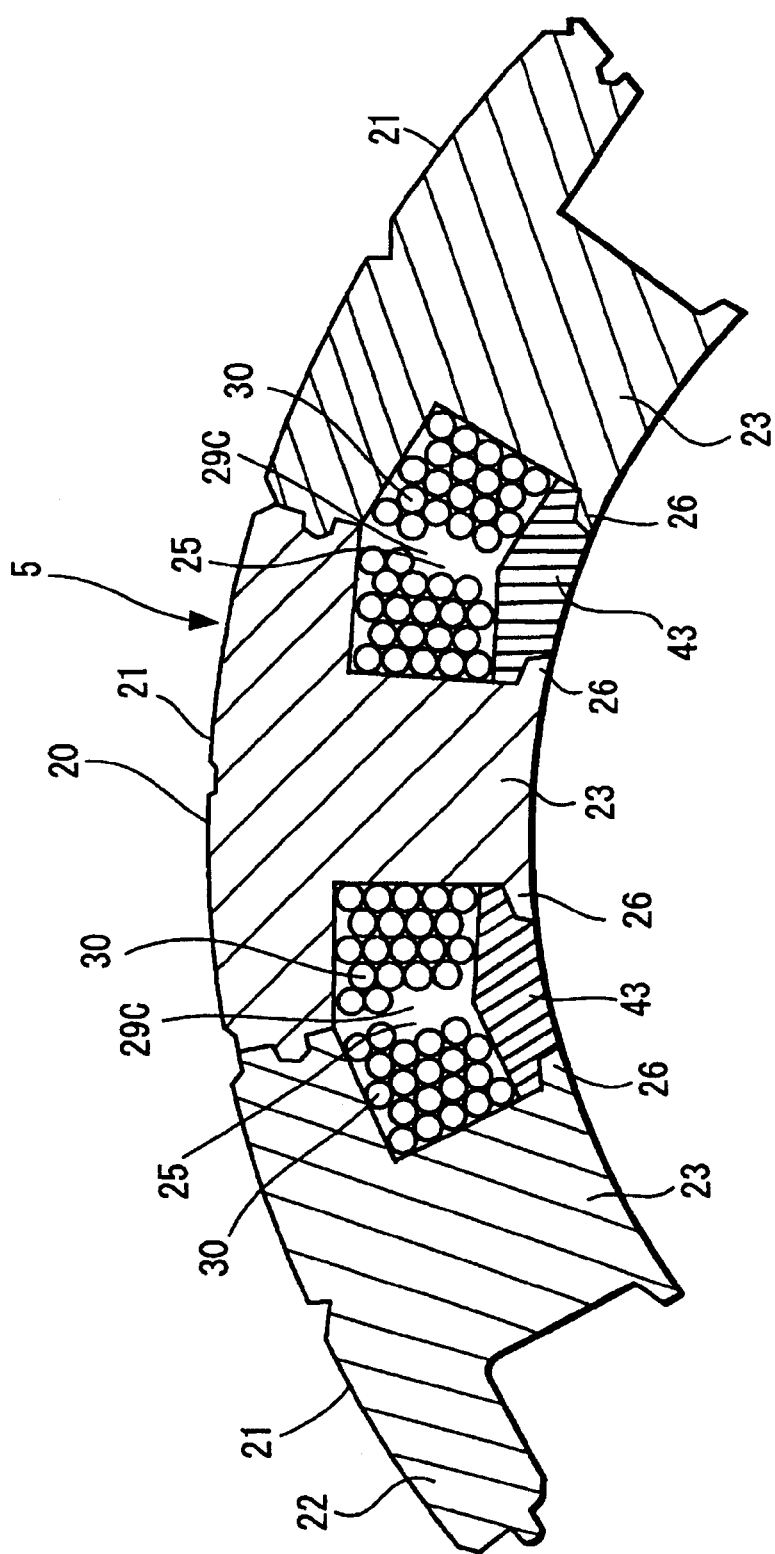
FIG. 5 is a partially sectional view showing a section of FIG. 1 along the line II—II of the stator according to a third embodiment of this invention.

Referring to FIG. 5, the stator 5 according to a third embodiment of this invention will be described below.

In this embodiment, the coils 30 are wound only in a coiling region limited to the bottom of the slot 25. This coiling region has a fixed range extending from the bottom of the slot 25 to the inner face of the under plate 43 along the length of the teeth 23. In other words, the coiling region is defined by the bottom of the slot 25, the inner face of the under plate 43, and the lateral faces of the teeth 23. The fixed range is determined, in the manner that the performance of the rotating electric machine and the cooling performance of the cooling passage is ensured.

To describe this in more detail, in this embodiment, there are firstly five wire turns in a first layer. The wire turns are performed from the base of the teeth 23 towards the tip without a clearance up to the end of the coiling region. Next, a second layer comprising four wire turns, a third layer with five wire turns, a fourth layer with four wire turns and a fifth layer with two wire turns are wound over the first wire layer. In this manner, a total of twenty wire turns are performed on the teeth 23.

Thus the clearance between coils 30 wound on adjacent teeth 23 is smaller than in the first embodiment since there are five layers of coils 30 wound onto each of the teeth 23. Further, the width of the coiling in the longitudinal direction of the teeth 23 narrows from a width corresponding to six turns as in the first embodiment to a width corresponding to five turns. As a result, a space is formed near to the opening of the slot 25 which is wider than that in the first embodiment above.

An under plate 43 having a cross-sectional area which is larger than the under plate 40 in the first embodiment is fitted in order to fill the entire space near to the opening of the slot 25 which is wider in comparison to the first embodiment. The inner face of the under plate 43 comes into contact with the end of the coils 30 without a clearance.

The cooling passage 29C is fixed in the slot 25 by the under plate 43. Thus the cooling passage 29C comprises a section excluding the volume occupied by the coils 30 from the narrow coiling region in the slot 25. Since the cross-sectional area of the under plate 43 is greater than the cross-sectional area of the under plate 40, a cross-sectional area S4 of the cooling passage 29C is smaller than the cross-sectional area Si of the cooling passage 29 in FIG. 2. Since this reduction in the cross-sectional area of the passage allows improvements in cooling efficiency, it is possible to effectively cool the stator 5 with a small amount of cooling medium.

In this embodiment, since it is not necessary to fit a regulating member separately from the under plate 43 in order to reduce the cross-sectional area of the cooling passage 29C, the number of components is reduced. Furthermore it is possible to simplify the assembly operation of the stator 5 and reduce costs.

Figure 6:
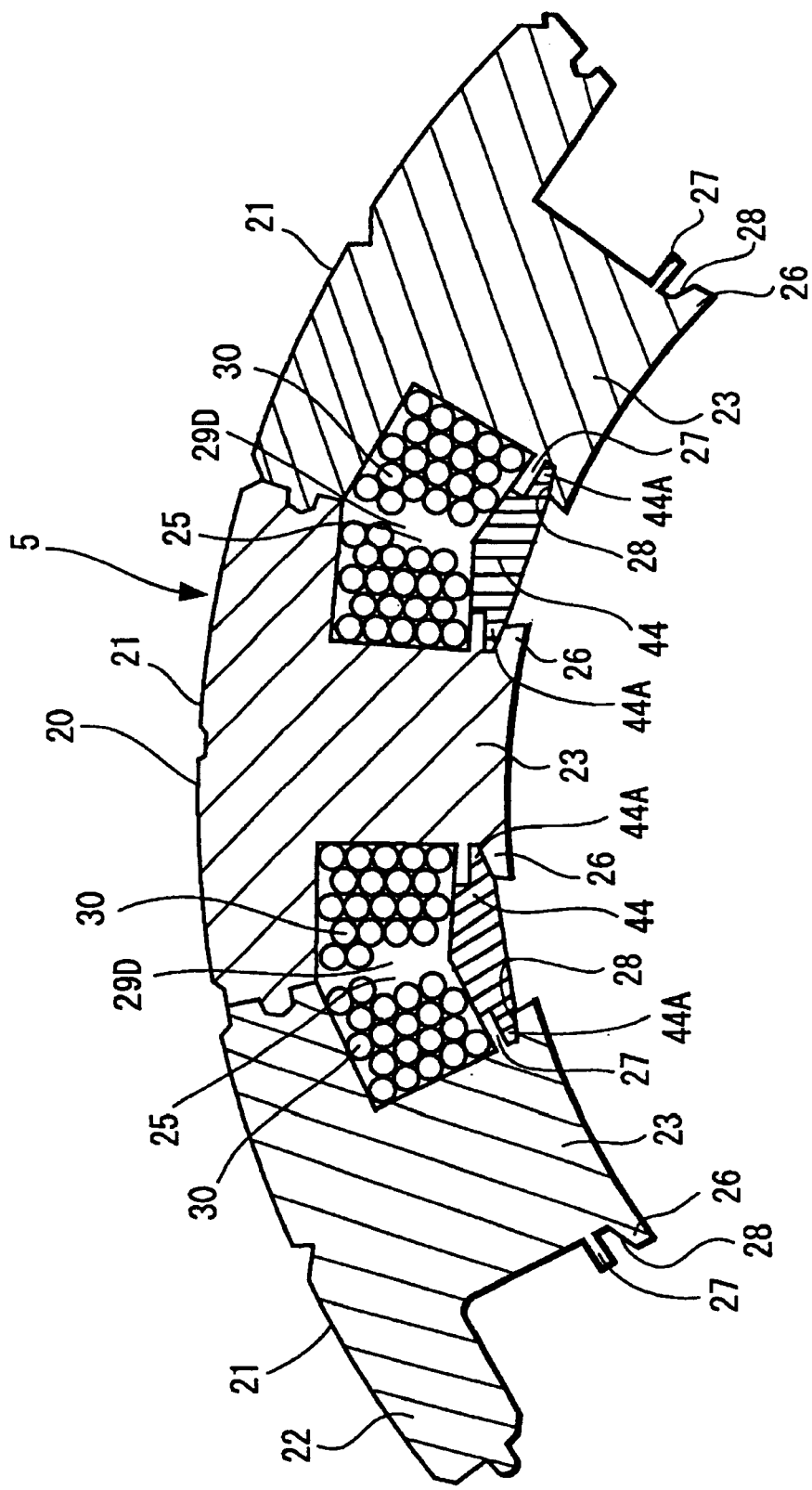
FIG. 6 is a partially sectional view showing a section of FIG. 1 along the line II—II of the stator according to a fourth embodiment of this invention.

Referring to FIG. 6, the stator 5 according to a fourth embodiment of this invention will be described below.

In this embodiment, the coils 30 are wound in a coiling region limited to the bottom of the slot 25 in the same manner as the stator 5 in the third embodiment as shown in FIG. 5. Stoppers 27 project from a face on both sides of the teeth 23 into the inner section of the slot. The stoppers 27 are positioned on the end of the coiling region near the opening of the slot 25.

In this manner, the coiling region is limited by the stopper 27. Windings are performed in a range from the base of the teeth 23 to the stopper 27. Furthermore the wound coils 30 are supported by the stopper 27 to prevent detachment from the coiling region to the opening of the slot 25. Since the region for winding coils 30 is limited to the coiling region on the bottom side of the slot 25, the number of layers of coils when winding with an equal number of turns can be increased in comparison to a case when the coiling region is not limited in the above manner. It is noted however that this arrangement also makes it possible to accurately regulate the windings with the function of the stopper.

In this embodiment, the under plate 44 closes the opening of the slot 25. The cross-sectional area S5 of the cooling passage 29D is smaller than cross-sectional area of the cooling passage 29 in FIG. 2. As a result, it is possible to cool the stator 5 efficiently with a small amount of cooling medium.

The section between the projection 26 and the stopper 27 comprises a retaining groove 28. The under plate 44 is gripped and fixed in the retaining groove 28 by an engagement section 44A on both ends of the under plate 44. In this manner, when the under plate 44 is fitted, accurate positioning is facilitated.

Figure 7:
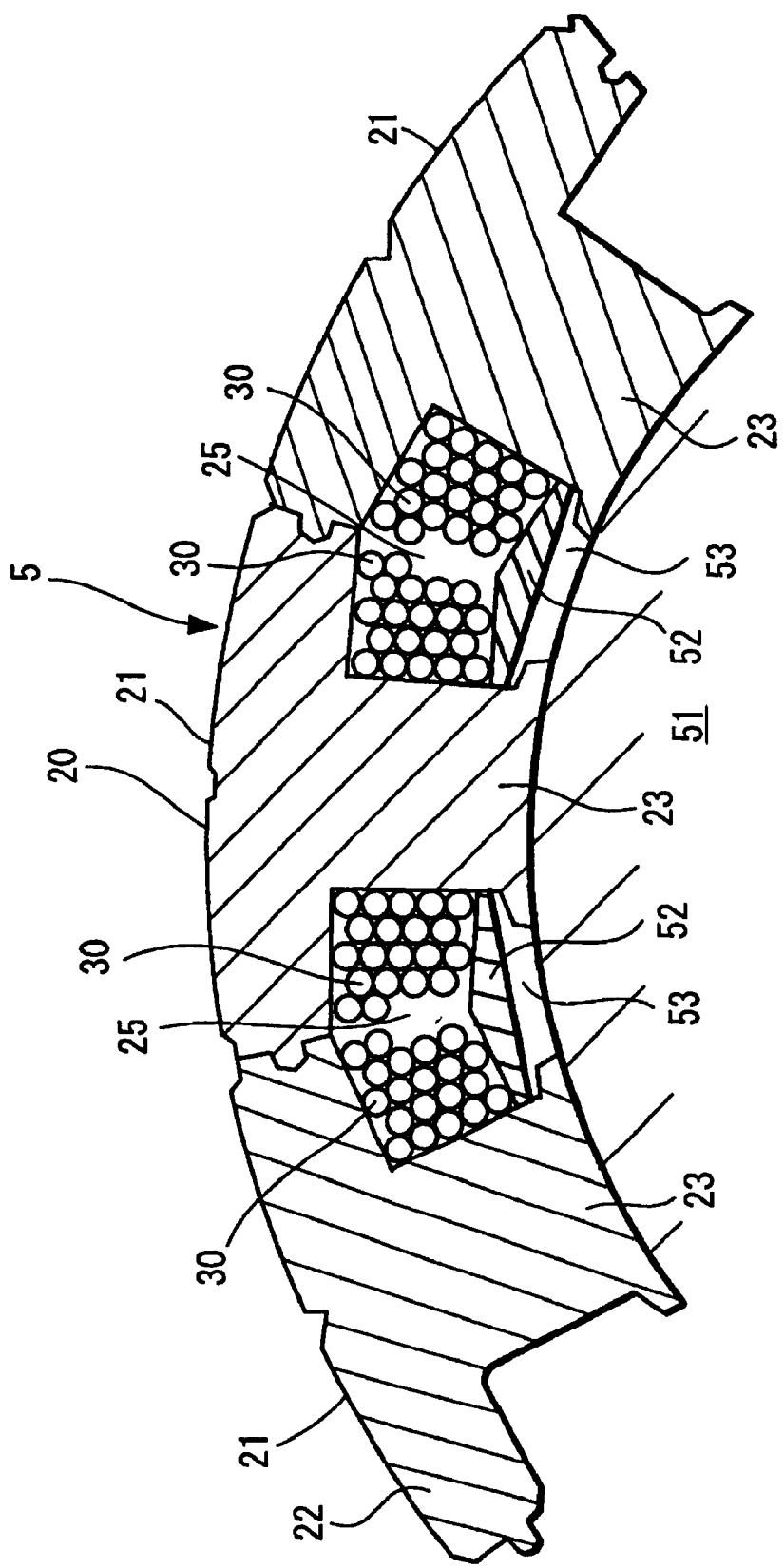
FIG. 7 is a partially sectional view showing a section of FIG. 1 along the line II—II of the stator as partially manufactured, according to a fifth embodiment of this invention.
Figure 8:
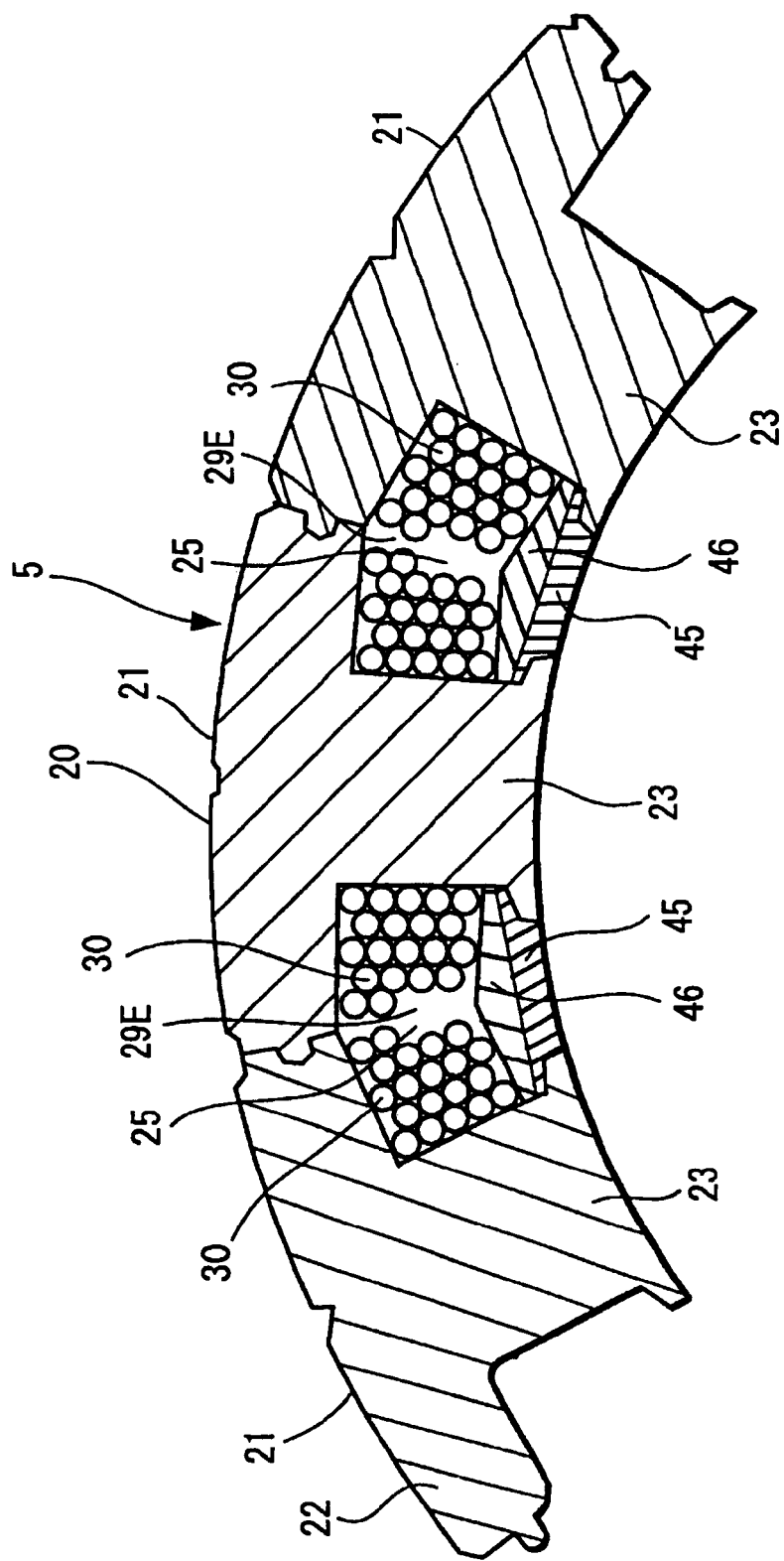
FIG. 8 is a partially sectional view showing a section of FIG. 1 along the line II—II of the stator according to a fifth embodiment of this invention.

A fifth embodiment of this invention will be described with reference to FIG. 7 and FIG. 8. FIG. 7 shows the stator 5 as partially manufactured. FIG. 8 shows the stator 5 as completed.

In this embodiment, a cross-sectional area S6 of the cooling to passage 29E is decreased by winding coils 30 only in the coiling region on the bottom side of the slot 25 in the same manner as the third embodiment shown in FIG. 5 and the fourth embodiment shown in FIG. 6. The closing member partitioning the cooling passage 29E is characterized in being formed from two members, the two members being the resin-molded plate 45 (first member) and the under plate 46 (second member).

As shown in FIG. 7, a mold 51 is set along the inner peripheral face of the stator S and a plate-shaped mold 52 is set in each slot 25 of the stator 5 in order to form the resin-molded plate 45. The plate-shaped mold 52 has substantially the same shape as the under plate 46 and is set in order to make contact with the coils 30 stored in the slot 30.

When the molds 51, 52 are set in this manner, resin is injected into and fills a space 53 defined between the molds 51, 52. The resin-molded plate 45 is formed in the opening of the slot 25 by allowing the resin to harden.

Once the resin-molded plate 45 is formed in this manner, the molds 51, 52 are removed. After the plate-shaped mold 52 is removed, the under plate 46 is fitted in the space between the resin-molded plate 45 and the coils 30 as shown in FIG. 8. Thus a cooling passage 29E is formed inside the under plate 46.

Therefore the cross-sectional area of a cooling passage 29E formed in the slot 25 may be reduced by fitting an under plate 46 with the result that the cooling performance is improved.

Although the invention has been described above by reference to certain embodiment of the invention, the invention is not limited to the embodiment described above.

The entire contents of Japanese Patent Applications P2000-379747 (filed Dec. 14, 2000) are incorporated herein by reference.

Modifications and variations of the embodiment described above will occur to those skilled in the art, in light of the above teachings. The scope of the invention is defined with reference to the following claims.

What is claimed is:

1. A rotating electric machine comprising:
    a stator having a stator core and a slot, the stator core comprising a substantially cylindrical back core section and two adjacent teeth each projecting in a radial direction from the substantially cylindrical back core section, wherein the slot is formed between the two adjacent teeth;
    a coil wound around one of the teeth by using concentrated windings, the coil being housed in the slot;
    a projection projecting from a face of said one of the teeth to an inner section of the slot substantially in a circumferential direction;

a stopper disposed on a lateral face of said one of the teeth between the projection and the substantially cylindrical back core section, the stopper projecting to the inner section of the slot substantially in a circumferential direction, wherein the stopper and the substantially cylindrical back core section define a coiling region through which the coil is wound, whereby the stopper supports the coil in contact with the coil; and a closing member for closing the opening of the slot to form a cooling passage in the slot, wherein the closing member is supported by a groove formed between the projection and the stopper.

2. The rotating electric machine according to claim 1 wherein the closing member is disposed in contact with the coil to support the coil.

* * * * *